(12) United States Patent
Sun et al.

(10) Patent No.: US 11,388,426 B2
(45) Date of Patent: Jul. 12, 2022

(54) DECODER FOR PLAYING BIG FRAMES

(71) Applicant: Intel Corporation, Santa Clara, CA (US)

(72) Inventors: Min Zhi Sun, Shanghai (CN); Zhan Lou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 15/114,478

(22) PCT Filed: Dec. 17, 2015

(86) PCT No.: PCT/CN2015/097698
§ 371 (c)(1),
(2) Date: Jul. 27, 2016

(87) PCT Pub. No.: WO2017/101065
PCT Pub. Date: Jun. 22, 2017

(65) Prior Publication Data
US 2018/0027251 A1    Jan. 25, 2018

(51) Int. Cl.
*H04N 19/44* (2014.01)
*H04N 19/436* (2014.01)
*H04N 19/513* (2014.01)
*H04N 19/65* (2014.01)

(52) U.S. Cl.
CPC .......... *H04N 19/44* (2014.11); *H04N 19/436* (2014.11); *H04N 19/513* (2014.11); *H04N 19/65* (2014.11)

(58) Field of Classification Search
None
See application file for complete search history.

(56) References Cited

U.S. PATENT DOCUMENTS

| | | | |
|---|---|---|---|
| 7,843,959 B2 | 11/2010 | Kampmann et al. | |
| 8,401,084 B2 | 3/2013 | MacInnis | |
| 9,338,468 B2 | 5/2016 | Yang et al. | |
| 2011/0096829 A1* | 4/2011 | Han | H04N 19/177 375/E7.126 |
| 2011/0206133 A1* | 8/2011 | Hugosson | H04N 19/436 375/E7.2 |

(Continued)

OTHER PUBLICATIONS

PCT Search report and Written Opinion in corresponding PCT/CN2015/097698 dated Sep. 1, 2016 (7 pages).

*Primary Examiner* — Kaitlin A Retallick
(74) *Attorney, Agent, or Firm* — Trop, Pruner & Hu, P.C.

(57) ABSTRACT

The decode time of big frames may be reduced by starting big frame decoding much earlier than normal decoding order. In a multi-threaded decoder, decoding one frame can be divided into several stages and stages of different frames can run in parallel like a pipeline. The first stage may be the token parser which is the most time consuming among all the stages because it is sensitive to bitstream size. If one or more stages of big frame decoding can be done much earlier than normal decoding order, the decode time spent exclusively on the big frame (not including the time shared with other frame decoding) may be much less in some embodiments. In this way, big frame decoding time may be reduced and in addition, depending on how big the big frame is, the decoder control can control how early to start decoding, so that frame drops caused by big frames can be reduced or eliminated.

26 Claims, 6 Drawing Sheets

(56) References Cited

U.S. PATENT DOCUMENTS

| | | | |
|---|---|---|---|
| 2013/0272415 A1* | 10/2013 | Zhou | H04N 19/176 375/240.16 |
| 2014/0082146 A1* | 3/2014 | Bao | H04L 69/22 709/219 |
| 2015/0206511 A1* | 7/2015 | Kilgariff | H04N 19/423 345/502 |
| 2016/0171641 A1* | 6/2016 | Jeon | H04N 19/70 345/501 |
| 2017/0034538 A1* | 2/2017 | Lee | H04N 19/91 |
| 2017/0064313 A1* | 3/2017 | Wu | H04N 19/172 |

* cited by examiner

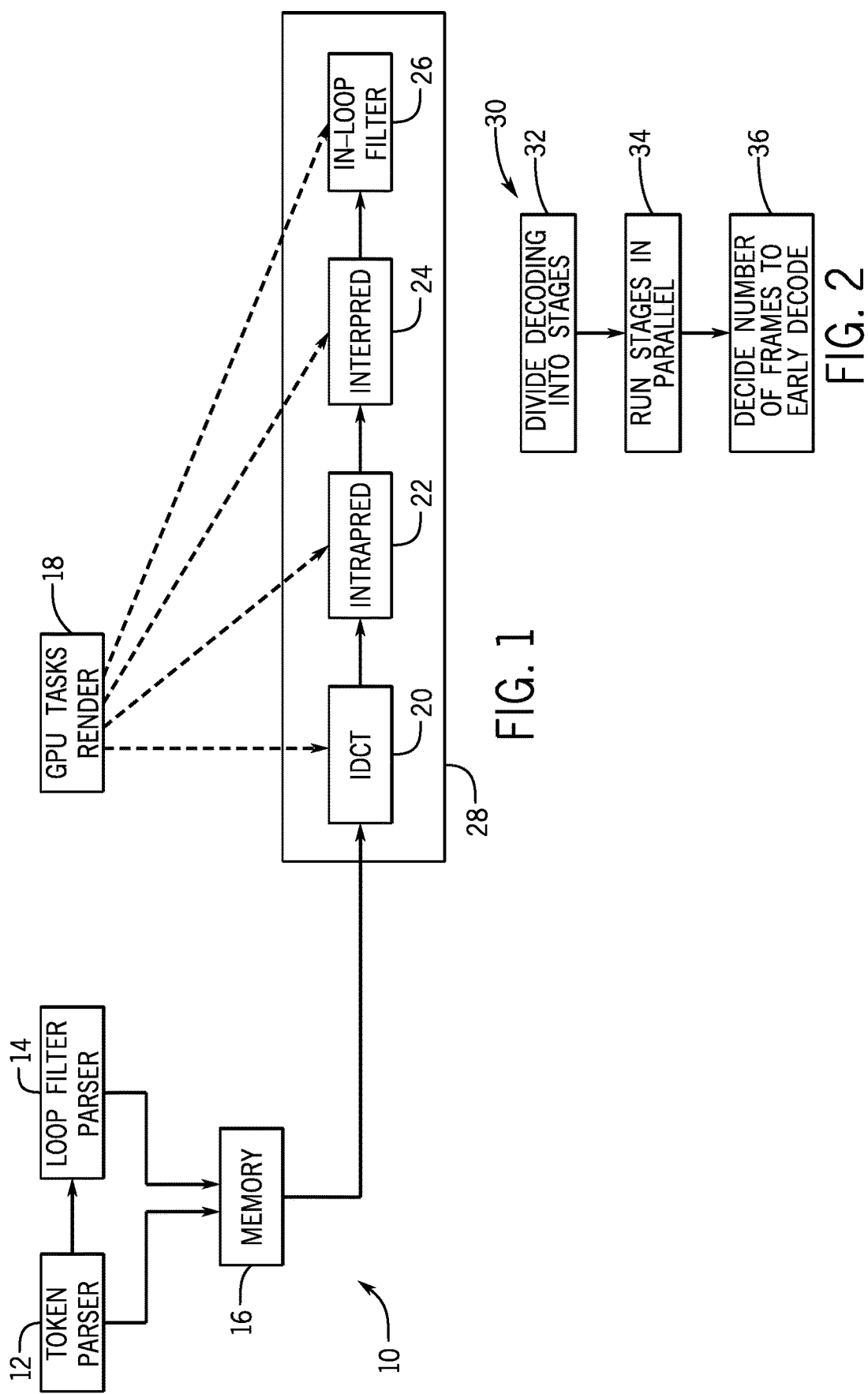

DECODER FOR PLAYING BIG FRAMES

BACKGROUND

In many compressed streams being decoded for playback, the bit rate or frame size varies over a relatively large range. For example, the largest frame size may be tens of times the size of the smallest frame size.

For these types of video streams, a video decoder may have performance issues when decoding the big frames. A big frame is a frame that has peak bitrate that is much higher than the average bit rate.

VP9 is a video compression format developed by Google. See VP9 profile 0 release candidate (2013-6-11) available from Google. For example a VP9 decoder that can play many clips with an average bit rate of 200 Megabits per second, 4K resolution and 30 frames per second, may have frame drops and video stuttering when playing a clip with a peak bitrate of 400 Megabits per second.

Generally the larger the frame size, the longer the decode time. The root cause of the performance issue with big frames is that the decoder needs much more time to decode these big frames.

A decoder may display a frame every 33 milliseconds for a 30 frame per second clip. The big frame takes much longer to finish decoding. A renderer may not find any frames to display at time Tn because the decoder has not finished decoding the big frame. At Tn+2, the frame decoding is finished but the renderer has to drop frames until Tn+4 because the timestamps indicate those frames (n to n+3) are too late to display. As a result, a relatively long decode time is needed for big frames, causing frame drops during video playback.

BRIEF DESCRIPTION OF THE DRAWINGS

Some embodiments are described with respect to the following figures:

FIG. 1 is a schematic depiction of one embodiment;
FIG. 2 is a flow chart for one embodiment.

DETAILED DESCRIPTION

Figure 3:
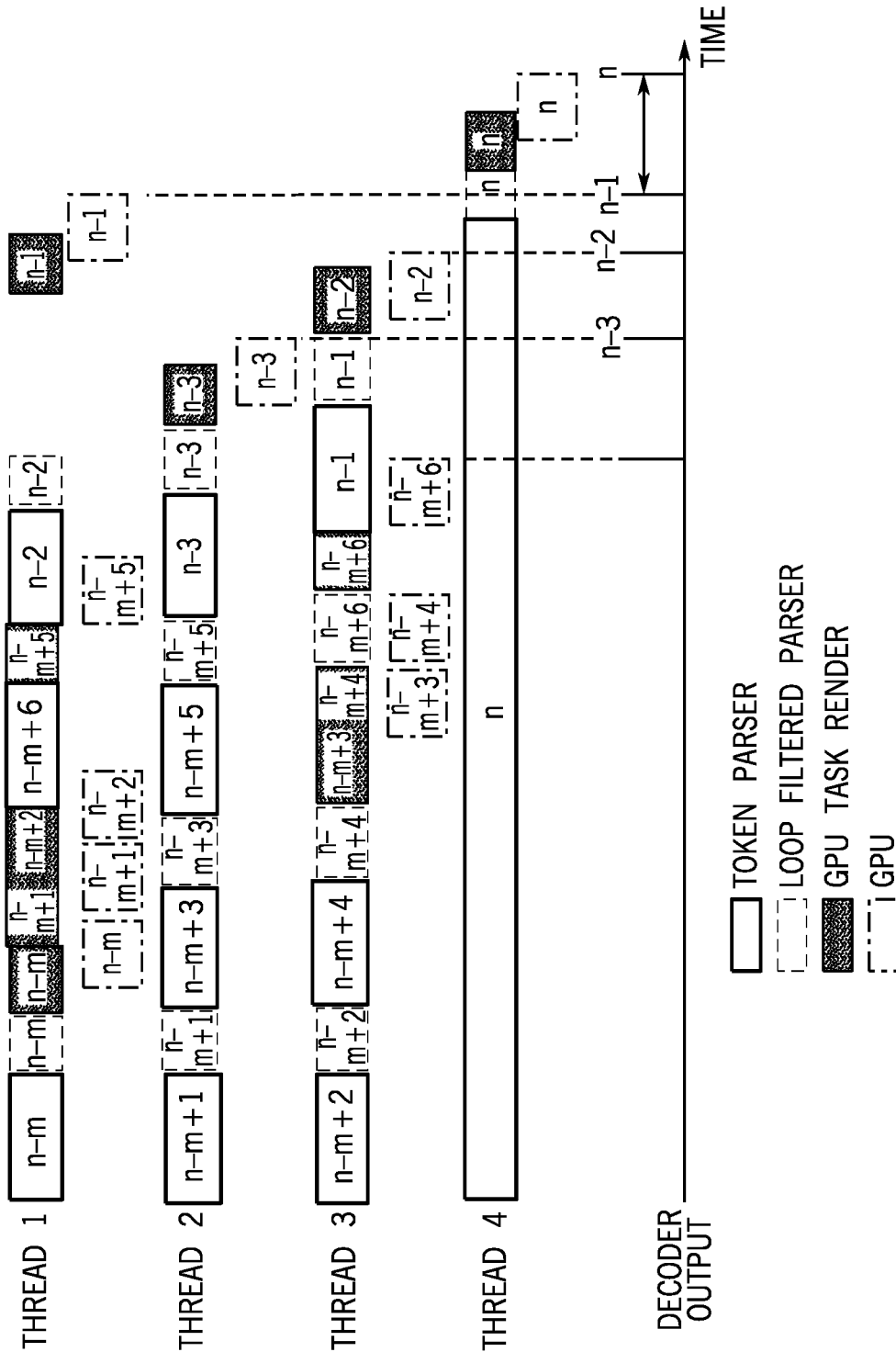
FIG. 3 is a timing diagram for one embodiment.

The decode time of big frames may be reduced by starting big frame decoding much earlier than normal decoding order. In a multi-threaded decoder, decoding one frame can be divided into several stages and stages of different frames can run in parallel like a pipeline. The first stage may be the token parser which is the most time consuming among all the stages because it is sensitive to bitstream size. If one or more stages of big frame decoding can be done much earlier than normal decoding order, the decode time spent exclusively on the big frame (not including the time shared with other frame decoding) may be much less in some embodiments. In this way, big frame decoding time may be reduced and in addition, depending on how big the big frame is, the decoder control can control how early to start decoding, so that frame drops caused by big frames can be reduced or eliminated.

In order that token parsing of big frames can start as needed, the dependencies in entropy decoding between frames are removed. The decoder can control how many frames to early decode based on how big is the big frame size compared with average frame size, in order to totally eliminate frame drops. If there is a probability adaption dependency defined in VP9 bit streams, some frames (including key frames) can still be early decoded as long as they can meet a condition described hereinafter.

Referring to FIG. 1, an architecture for a VP9 decoder is implemented in a central processing unit 10 and graphics processing unit 28. The decoder begins with the token parser 12 which parses a bitstream and outputs tokens/syntax to memory and the loop filter parser 14. The loop filter parser 14 parses out syntax/parameters needed by the in-loop filter 26 and also saves them to memory 16.

The graphics processing unit (GPU) task renderer 18 prepares a workload and renders tasks to the GPU as indicated. Namely the GPU may include an Inverse Discrete Cosine Transfer (IDCT), an intra prediction module 22, an inter prediction module 24 and an in-loop filter 26. The GPU task renderer 18 takes tasks assigned by the central processing unit (CPU) and assigns them to the right module of the graphics processing unit 28.

In some embodiments, video clips can be decoded without frame drops whether or not a frame parallel feature, that allows parallel processing during encoding, is enabled or not. These clips can be decoded without frame drops or video stutter even when there is a probability adaptation dependency. This dependency is because a motion vector (MV) or segment identifier (ID) of co-located blocks in a previous frame may be used as predictions of a current block, which makes deriving the current block's motion vector and segment identifier dependent on co-located blocks in previous frames. This dependency explains why there is a central processing unit idle time inside the token parser module in conventional decoding. Thus, in some embodiments, a more flexible solution is provided that is not limited by the number of available hardware threads.

A bit stream syntax may indicate that segment ID or motion vector (MV) of a block is predicted from the value of its collocated block in previous frame. This entropy decoding dependency between adjacent frames in VP9 codec makes existing early frame decoding inadequate. With frame parallel decoding in the known solution, big frames are early decoded, but hardware thread numbers limit how many frames to early decode, which is usually not enough to totally eliminate frame drops in most cases. In some embodiments described herein, the entropy decoding dependency between token parsers is removed, and big frames decoding can start as early as needed.

VP9 codec is different from previous codecs in that there could be probability adaption dependency between frame entropy decoding which means one frame's token parser cannot start until the token parser of its previous frame finishes. Frame parallel decoding in the known solution cannot work at all in this case. The known solution always has a fixed number of frames (hardware thread number—1) to early decode, but some embodiments described herein can automatically decide how many frames to early decode based on the big frame size, without limitation based on a hardware thread number.

Referring to FIG. 2, the sequence 30 may be implemented in software, firmware and/or hardware. In software and firmware embodiments it may be implemented by computer executed instructions stored in one or more non-transitory computer readable media such as magnetic, optical or semiconductor storage. Generally the sequences may be implemented by a central processing unit and computer executed instructions may be stored in a storage that is part of the central processing unit or external thereto.

The sequence 30 begins by dividing the decoding into stages as indicated in block 32. Then at least two stages are run in parallel as indicated in block 34. Finally, it is decided whether the number of frames to early decode based on how big a given big frame is as indicated in block 36.

As an example, a graphics processing unit accelerated VP9 decoder may be used to elaborate one embodiment. Another embodiment may include a multi-threading VP9 decoder.

As shown in FIG. 1, there are four decoding stages that may run in parallel in one embodiment including token parser, loop filter parser, GPU task renderer and the GPU tasks. The token parser parses a bitstream and generates block mode information and coefficient tokens used by the intra and inter prediction modules. The loop filter parser calculates loop filter parameters such as structural and level. The GPU task renderer prepares all the data buffers and surfaces needed by the graphics processing unit kernel and submits the tasks. The graphics processing unit modules 20, 22, 24 and 26 read from memory 10 and perform computationally intensive tasks such as IDCT, intra and inter prediction, and in-loop filtering.

In some embodiments, the token parser stage is run in advance for big frames whether or not frame parallel decoding is enabled and whether or not there is probability adaptation dependency in the video clip.

Two cases may be handled. The first case is one in which no probability adaption dependency occurs between frames. The other case is where you do have probability adaptation dependency between frames.

In the first case, the token parser for different frames runs in parallel. By starting the token parsing of a big frame early, the frame may be handled more expeditiously. To run the token parser earlier than the normal decode order, there may be no dependencies among the token parsers. A motion vector (MV) or segment identifier (ID) of co-located blocks in a previous frame may be used as predictions of a current block, which makes deriving the current block's motion vector and segment identifier dependent on co-located blocks in previous frames. This dependency explains why there is a central processing unit idle time inside the token parser module in conventional decoding.

This kind of dependency may be removed to make early running of the token parser possible. Particularly, motion vector and segment identifier parsing can be separated from their deriving. Parsing is done in the token parser and deriving is done in the in-loop filter. In this way, token parsers of all frames do not have any dependency. Therefore, the token parser can run in parallel and little or no central processing unit idle time is consumed by the token parser.

Referring to FIG. 3, a big frame n is early decoded by m frames. The token parser of the big frames run simultaneously with its previous m frames. There is no processor idle time inside the token parser and processor utilization may be improved in some embodiments. The decode time is also reduced to a value similar to that of normal sized frames.

In the second case where there is a probability adaptation dependency between frames, the token parsers cannot run in parallel and they can only run sequentially. In one embodiment, only key frames are early decoded. Key frames in the VP9 technology correspond to conventional I-frames. In VP9, key frames usually have a much bigger frame size than non-key frames. Moreover, the key frame is one of the frames whose token parsers could run earlier and therefore key frames are amenable to parallel, early processing.

In addition, some big frames may be early decoded as long as they can meet the dependency condition below:

Key frame||error_resilient_mode==true||(intra_only && reset_frame_context==3)||

(intra_only && reset_frame_context==2 && frame_context_idx==0)

This condition is deduced from the probability reset algorithm in a VP9 codec. Frames meeting this condition can do entropy decoding, regardless of any probability adaption in the previous frame.

In the VP9 Specification, if the bit stream syntax indicates error_resilient_mode=1 for a frame, then this frame will not have probability adaption dependency on its previous frame. In this way, if there is any error in previous frame, this frame could decode correctly without referring to information in previous frame. And this realizes error resilience to some extent.

Intra_only means all coding blocks in current frames are intra prediction, and there is no inter frame prediction used in current frames. No reset reset_frame_context is an indicator about how to do the probability reset. It can be {0, 1, 2, 3}. 0, 1 means not resetting. 2 means reset specified probabilities, 3 means reset all probabilities. Reset probability means the frame will use default initialized values for the probabilities. So the frame will not have probability dependency on its previous frame. Then early decoding the frame is viable.

Figure 4:
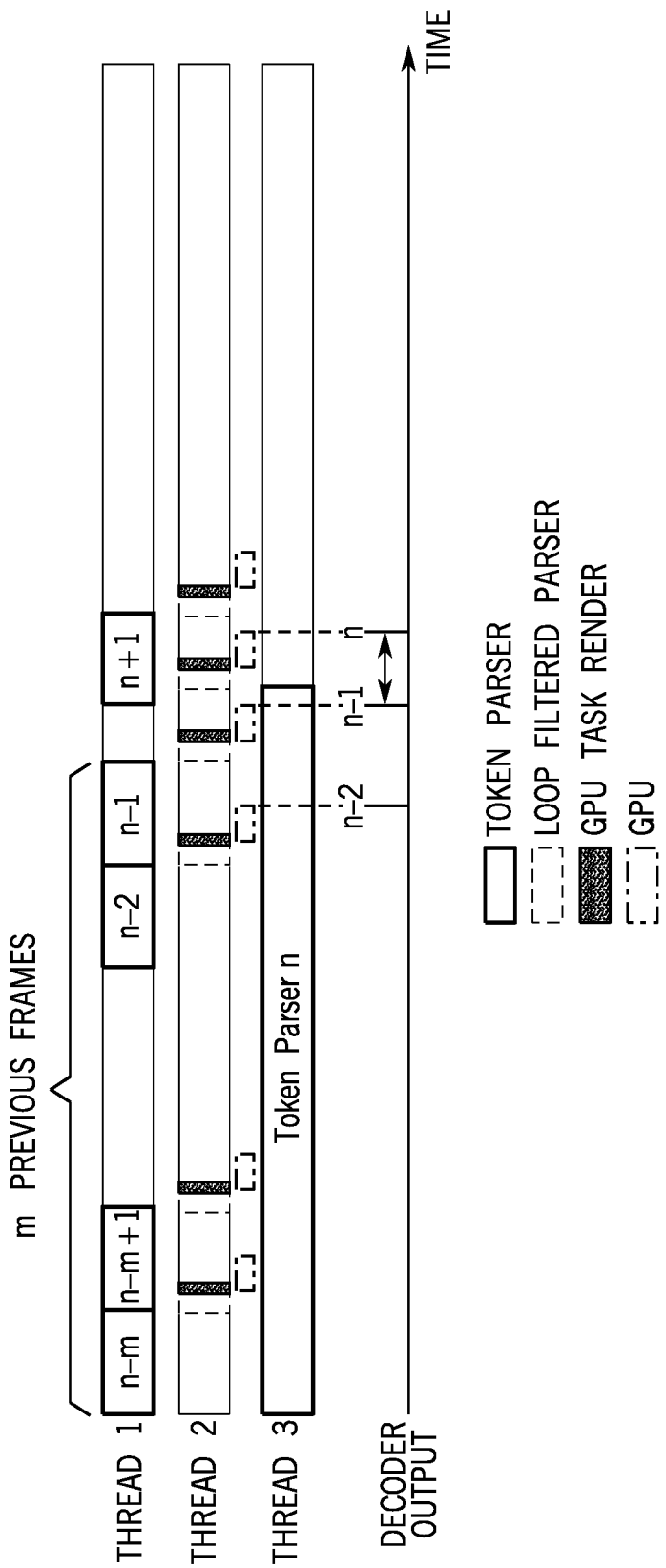
FIG. 4 is a timing diagram for another embodiment.

By running the token parser of a key frame to make it parallel with its previous n frames, as shown in FIG. 4, the frame decoding time may be greatly reduced to a value close to that of other frames in some embodiments.

In addition, for both cases, a decoder can decide how many frames m to early decode. It may do this by comparing the big frame size and average frame size. The number of frames to early decode can be much bigger than the number of threads. So, with a proper number of early frames to decode, the big frame decode can be reduced to a small and enough value to make sure that a frame drop does not occur.

Figure 5:
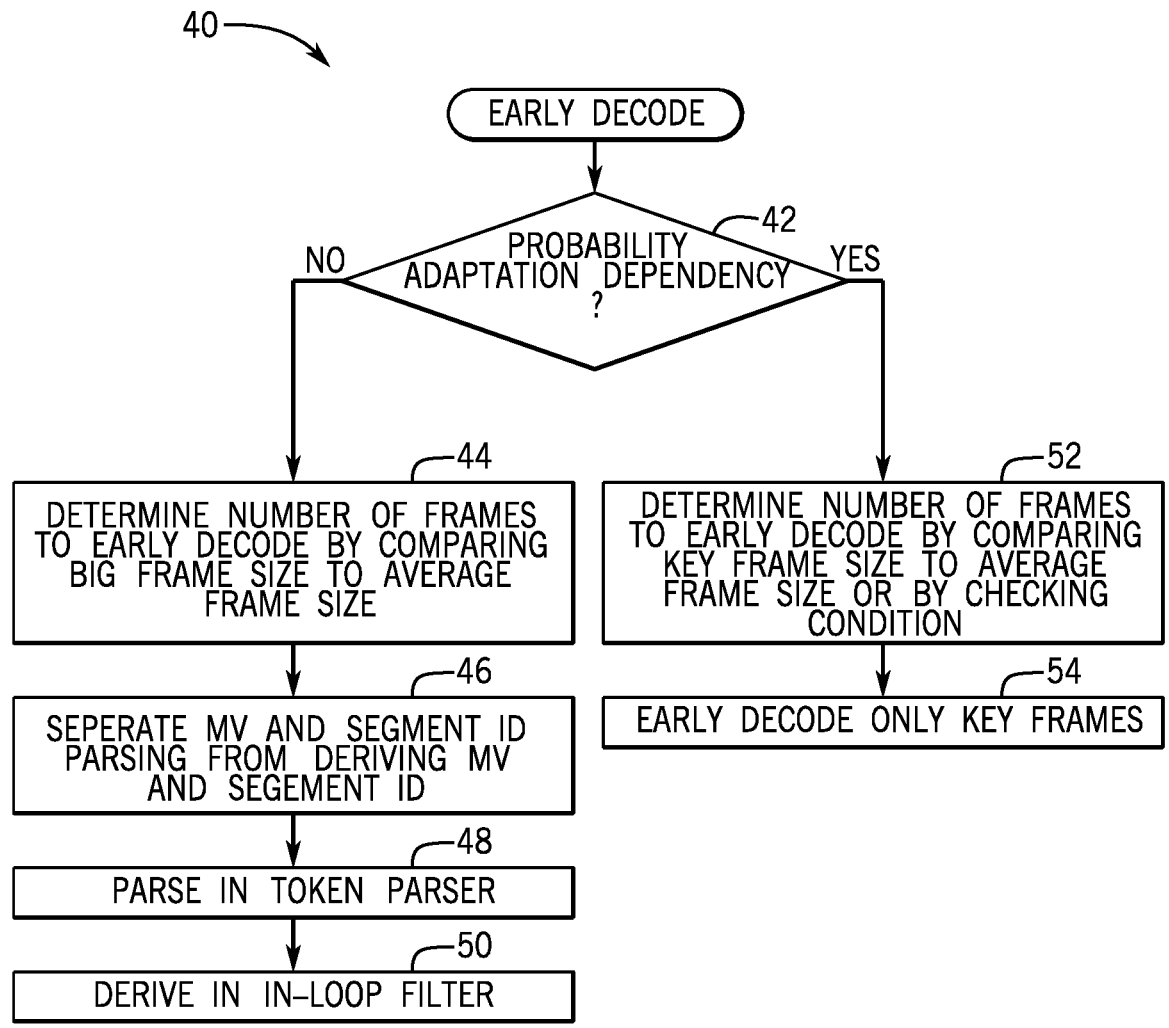
FIG. 5 is a flow chart for another embodiment.

Referring to FIG. 5, an early decode sequence 40 begins by determining whether there is a probability adaptation dependency, as indicated in diamond 42. If the dependency is met, then there is no probability dependency. If not, the number of frames to early decode is determined by comparing the big frame to a reference such as an average frame size or a fixed reference size, to mention two examples, as indicated in block 44. Then the motion vector and segment identifier parsing is separated from the deriving of the motion vector and segment identifier as indicated in block 46. Next, the parsing is done in the token parser as indicated in block 48 and the deriving is done in the loop filter as indicated in block 50.

However, if probability adaptation dependency does exist as determined in diamond 42, then at block 52 the number of frames to early decode is determined by comparing a key frame size to average frame size as indicated in block 52. Then early decoding is only done for the key frames as indicated in block 54.

Figure 6:
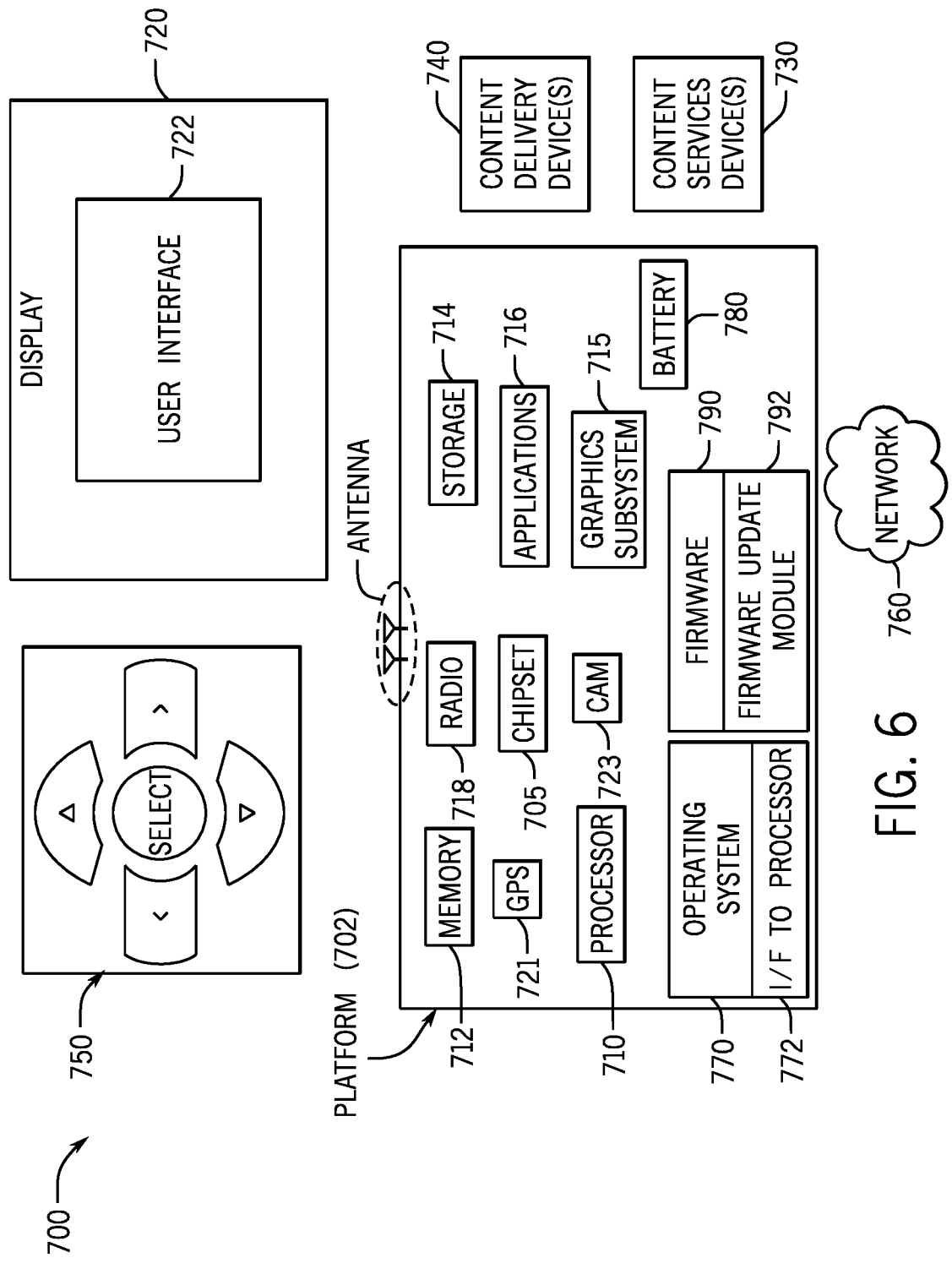
FIG. 6 is a schematic depiction of one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 5 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 7:
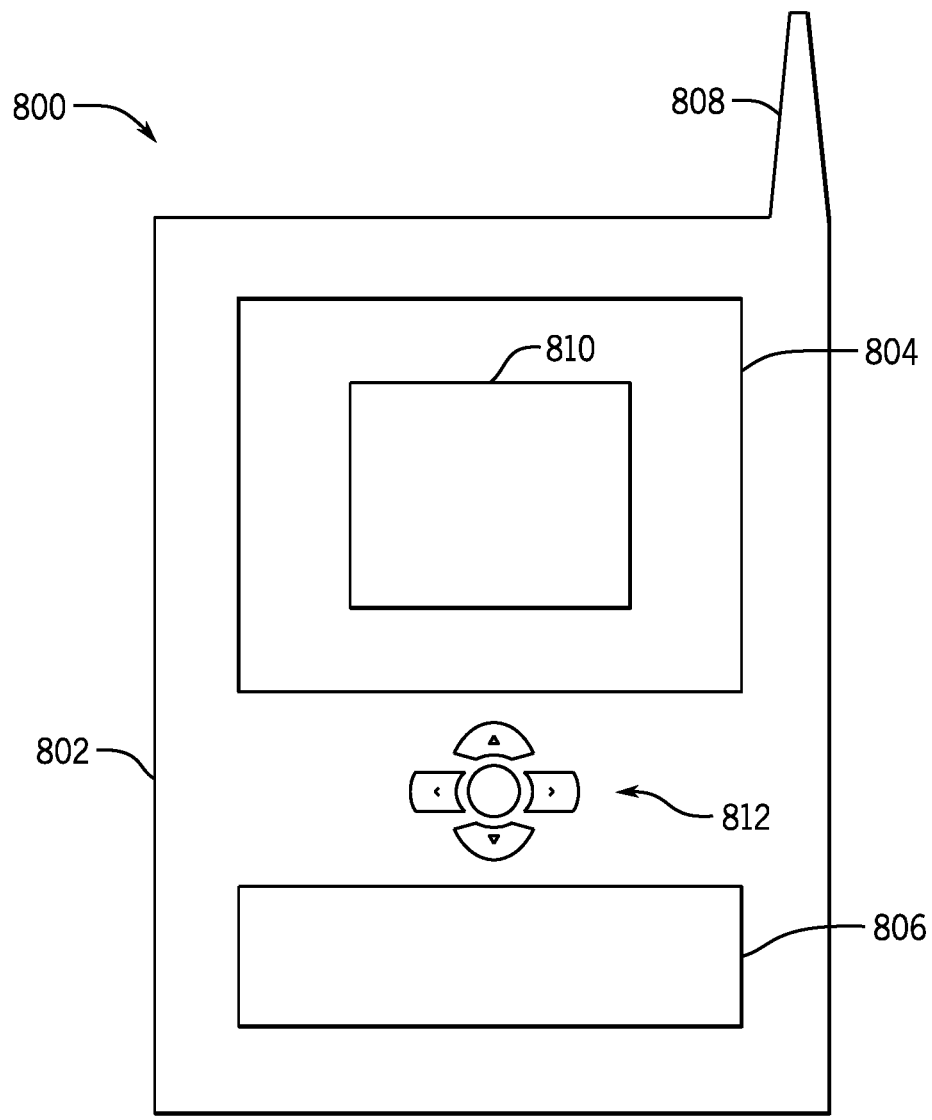
FIG. 7 is a front elevation of a system according to one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 7 in software and/or firmware embodiments.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method comprising determining whether there is a probability adaption dependency, if there is a dependency, removing said dependency, and determining a number of frames to early decode. The method may also include determining a number of frames to decode by comparing a key frame size to an average frame size and early decoding only key frames, when there is no dependency. The method may also include determining a number of frames to early decode by comparing a big frame size to an average frame size to a reference. The method may also include performing VP9 decoding. The method may also include token parsing different frames in parallel. The method may also include removing probability adaptation dependency by parsing motion vectors and segment identifiers in a token parser and deriving motion vectors and segment identifiers in an in-loop filter. The method may also include deciding when a dependency exists by checking a dependency condition. The method may also include checking the condition: Key frame||error_resilient_mode==true||(intra_only && reset_frame_context==3)||(intra_only && reset_frame_context==2 && frame_context_idx==0).

In another example embodiment may be one or more non-transitory computer readable media storing instructions to perform a sequence comprising determining whether there is a probability adaption dependency, if there is a dependency, removing said dependency, and determining a number of frames to early decode. The media may include further storing instructions to perform a sequence including determining a number of frames to decode by comparing a key frame size to an average frame size and early decoding only key frames, when there is no dependency. The media may include further storing instructions to perform a sequence including determining a number of frames to early decode by comparing a big frame size to an average frame size to a reference. The media may include further storing instructions to perform a sequence including performing VP9 decoding. The media may include further storing instructions to perform a sequence including token parsing different frames in parallel. The media may include further storing instructions to perform a sequence including removing probability adaptation dependency by parsing motion vectors and segment identifiers in a token parser and deriving motion vectors and segment identifiers in an in-loop filter. The media may include further storing instructions to perform a sequence including deciding when a dependency exists by checking a dependency condition. The media may include further storing instructions to perform a sequence including checking the condition: Key frame||error_resilient_mode==true||(intra_only && reset_frame_context==3)||(intra_only && reset_frame_context==2 && frame_context_idx==0).

Another example may be an apparatus comprising a processor to determine whether there is a probability adaption dependency, if there is a dependency, remove said dependency, and determine a number of frames to early decode, and a memory coupled to said processor. The apparatus may include said processor to determine a number of frames to decode by comparing a key frame size to an average frame size and early decoding only key frames, when there is no dependency. The apparatus may include said processor to determine a number of frames to early decode by comparing a big frame size to an average frame size to a reference. The apparatus may include said processor to perform VP9 decoding. The apparatus may include said processor to token parse different frames in parallel. The apparatus may include said processor to remove probability adaptation dependency by parsing motion vectors and segment identifiers in a token parser and deriving motion vectors and segment identifiers in an in-loop filter. The apparatus may include said processor to decide when a dependency exists by checking a dependency condition. The apparatus may include said processor to check the condition: Key frame||error_resilient_mode==true||(intra_only && reset_frame_context==3)||(intra_only && reset_frame_context==2 && frame_context_idx==0). The apparatus may include a battery coupled to the processor. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   determining whether a dependency exists in which decoding one frame is dependent on decoding another frame;
   in response to a determination that the dependency exists:
     removing said dependency so that decoding the one frame is not dependent on decoding the another frame;
     comparing a size of the one frame to a reference frame size; and
     determining a number of frames to early decode based on a comparison of the size of the one frame to the reference frame size.

2. The method of claim 1 including:
   in response to a determination that the dependency does not exist:
     determining the number of frames to early decode by comparing a key frame size to an average frame size; and
     early decoding only key frames.

3. The method of claim 1 including, in response to the determination that the dependency exists:
   comparing the size of the one frame to an average frame size; and
   determining the number of frames to early decode based on a comparison of the size of the one frame to the average frame size.

4. The method of claim 1 including performing VP9 decoding.

5. The method of claim 1 including token parsing different frames in parallel.

6. The method of claim 1, wherein removing the dependency comprises:
   parsing motion vectors and segment identifiers only in a token parser; and
   deriving the motion vectors and the segment identifiers only in an in-loop filter.

7. The method of claim 1 including determining whether the dependency exists by checking a dependency condition.

8. The method of claim 7 including checking the condition:
   Key frame||error_resilient_mode==true||(intra_only && reset_frame_context==3)||(intra_only && reset_frame_ context==2 && frame_context_idx==0).

9. One or more non-transitory computer readable media storing instructions to perform a sequence comprising:
- determining whether a dependency exists in which decoding one frame is dependent on decoding another frame;
- in response to a determination that the dependency exists:
- removing said dependency so that decoding the one frame is not dependent on decoding the another frame;
- comparing a size of the one frame to a reference frame size; and
- determining a number of frames to early decode based on a comparison of the size of the one frame to the reference frame size.

10. The media of claim 9, further storing instructions to perform a sequence including:
- in response to a determination that the dependency does not exist:
- determining the number of frames to early decode by comparing a key frame size to an average frame size; and
- early decoding only key frames.

11. The media of claim 9, further storing instructions to perform a sequence including:
- in response to the determination that the dependency exists:
- comparing the size of the one frame to an average frame size; and
- determining the number of frames to early decode based on a comparison of the size of the one frame to the average frame size.

12. The media of claim 9, further storing instructions to perform a sequence including performing VP9 decoding.

13. The media of claim 9, further storing instructions to perform a sequence including token parsing different frames in parallel.

14. The media of claim 9, wherein removing the dependency comprises:
- parsing motion vectors and segment identifiers only in a token parser; and
- deriving the motion vectors and the segment identifiers only in an in-loop filter.

15. The media of claim 9, further storing instructions to perform a sequence including determining whether the dependency exists by checking a dependency condition.

16. The media of claim 15, further storing instructions to perform a sequence including checking the condition:
- Key frame||error_resilient_mode==true||(intra_only && reset_frame_context==3)||(intra_only && reset_frame_ context==2 && frame_context_idx==0).

17. An apparatus comprising:
a processor to:
- determine whether a dependency exists in which decoding one frame is dependent on decoding another frame;
- in response to a determination that the dependency exists:
- remove said dependency so that decoding the one frame is not dependent on decoding the another frame;
- compare a size of the one frame to a reference frame size; and
- determine a number of frames to early decode based on a comparison of the size of the one frame to the reference frame size; and
a memory coupled to said processor.

18. The apparatus of claim 17, said processor to:
in response to a determination that the dependency does not exist:
- determine the number of frames to early decode by comparing a key frame size to an average frame size; and
- early decode only key frames.

19. The apparatus of claim 17, said processor to:
in response to the determination that the dependency exists:
- compare the size of the one frame to an average frame size; and
- determine the number of frames to early decode based on a comparison of the size of the one frame to the average frame size.

20. The apparatus of claim 17, said processor to perform VP9 decoding.

21. The apparatus of claim 17, said processor to token parse different frames in parallel.

22. The apparatus of claim 17, said processor to remove the dependency by:
- parsing motion vectors and segment identifiers only in a token parser; and
- deriving the motion vectors and the segment identifiers only in an in-loop filter.

23. The apparatus of claim 17, said processor to determine whether the dependency exists by checking a dependency condition.

24. The apparatus of claim 23, said processor to check the condition:
- Key frame||error_resilient_mode==true||(intra_only && reset_frame_context==3)||(intra_only && reset_frame_ context==2 && frame_context_idx==0).

25. The apparatus of claim 17 including a battery coupled to the processor.

26. The apparatus of claim 19 including firmware and a module to update said firmware.

* * * * *